Feb. 27, 1940.	C. G. STRANDLUND	2,191,929
PLOW
Filed May 21, 1938
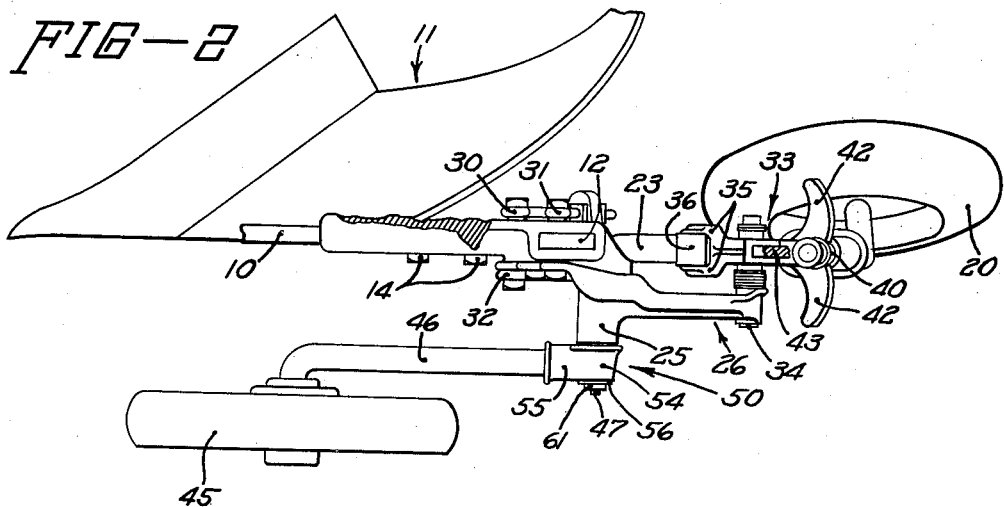
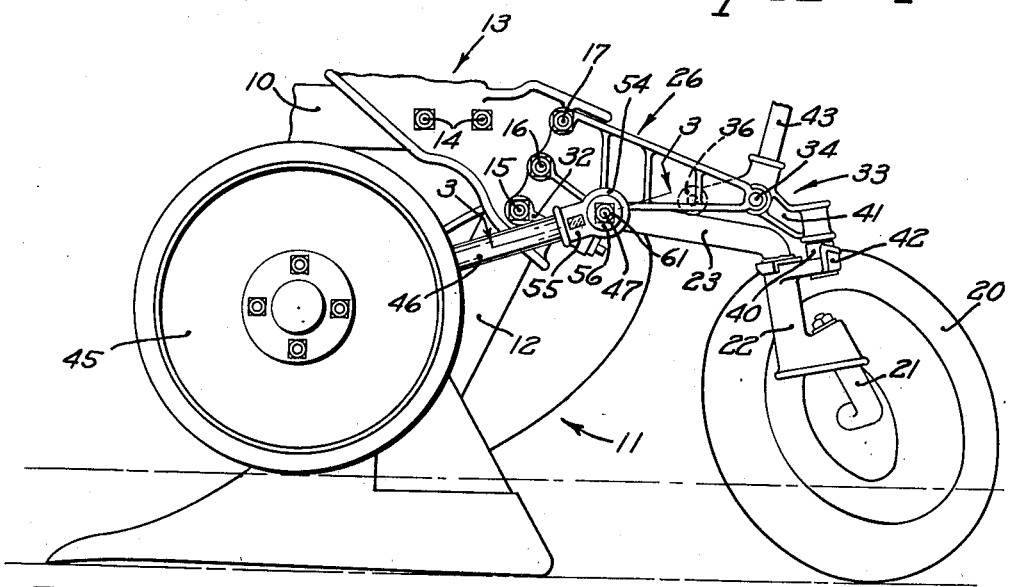
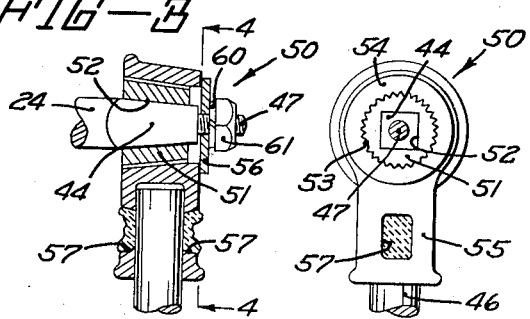
INVENTOR.
CARL G. STRANDLUND
ATTORNEYS Patented Feb. 27, 1940

2,191,929

UNITED STATES PATENT OFFICE 2,191,929

PLOW

Carl G. Strandlund, Moline, Ill., assignor to Deere & Company, Moline, Ill., a corporation of Illinois Application May 21, 1938, Serial No. 209,217

15 Claims. (Cl. 97—127)

The present invention relates to gauging means for controlling the working depth of plows and has as its principal object the provision of a new and improved gauge wheel device for holding the rearwardmost plow body of a gang plow to a constant predetermined working depth under all working conditions. More specifically, it is the object of the present invention to provide gauge wheel means adapted to maintain a uniform depth of plowing in soft ground conditions where the conventional gauge wheel has a tendency to dig into the soft surface and so cause the plow point to run deeper.

Heretofore a certain amount of difficulty has been experienced in holding the rear end of a gang plow to a constant working depth, especially when the ground is soft, and this becomes more pronounced as the number of plow bodies is increased. The front end of the plow is firmly held to the desired working depth, being supported on the furrow wheel and land wheel as well as by the draft connection on the tractor, whereas the overhanging rear end of the plow depends for its support on a relatively small rear furrow wheel trailing behind the last plow body and, in some instances, on an auxiliary gauge wheel disposed adjacent the rear end of the implement.

Normally, the influence of the rear furrow wheel alone on the working depth of its associated plow body is negligible since the wheel bears upon the bottom of the furrow just opened by the plow share and as the point of the plow goes deeper, the furrow wheel merely follows it down in the deeper furrow.

On the other hand, the operation of the conventional gauge wheel which is fixed in position relative to the point of the plow depends, to a large extent, upon the condition of the surface of the unbroken ground upon which it runs and if the ground is too soft to support the wheel, the latter tends to sink in and thereby cause the plow to dig deeper. In the accomplishment of the aforementioned objects, therefore, I have provided a furrow wheel and a gauge wheel in fore and aft spaced relation, both wheels being carried on the equivalent of a common support member which is pivotally connected intermediate its ends to the plow beam or other structural member. With this cradle-type gauge wheel structure the downward pressure of the plow is proportionally distributed between the two wheels, thereby reducing the pressure on the gauge wheel and enabling the latter to operate on soft ground without sinking in to an undesirable extent. When the plow tends to work its way deeper below the desired depth, the excess pressure on the gauge wheel causes the latter to swing upwardly about the pivotal connection, forcing the rear furrow wheel downwardly below the point of the plow. This exerts a lifting force on the plow bottom, gradually raising the latter until the excess pressure on the gauge wheel is relieved.

Another object of the present invention is to provide gauge wheel means adapted to ride over obstacles such as rocks or logs without wrenching the plow bottom out of the soil or damaging the supporting structure. Should the gauge wheel run over such an obstacle, the resulting sudden upward thrust is dissipated through the furrow wheel which is forced down into the soft soil in the bottom of the furrow.

Another object of the present invention is to provide gauging means which minimize the effect of uneven surface conditions on plowing depth and which hold the plow bottom to a uniform depth over even the most extreme corrugated surface. This is accomplished in the present invention by the pivotal connection of the wheel support member intermediate its ends to the plow beam or other structural element. Thus, when the gauge wheel rides over a rise in the ground the rear furrow wheel acts as a fulcrum and the plow body is raised only a fraction of the distance the gauge wheel rises.

Still another object is to provide an inexpensive and easily manufactured device for rigidly interconnecting the gauge wheel crank axle with the furrow wheel crank axle, said device being capable of relatively fine angular adjustment between the two axles. The accomplishment of this object is attained by using two clamping members having cooperating toothed surfaces which, by relative rotation therebetween, afford comparatively coarse angular adjustment between the axles equal in angular extent to one or more teeth on the clamping surfaces. Supplementing this coarse adjustment is an arrangement which permits finer angular adjustment between the axles of less than the width of one tooth.

These and other objects and advantages of the present invention will become apparent after a consideration of the following detailed description of the preferred structural embodiment thereof together with the appended drawing in which:

Figure 1 is a side elevation of the rear plow body of a gang plow embodying gauging means illustrating the principles of my invention;

Figure 2 is a plan view of the same structure;

Figure 3 is a sectioned detail view taken along the line 3—3 of Figure 1 showing the device used for adjusting the position of the gauge wheel with respect to the rear furrow wheel; and Figure 4 is a view taken along the line 4—4 of Figure 3.

Referring now to the drawing, 10 represents the rear end of a fore and aft extending draft beam of rectangular cross section comprising a portion of the supporting frame work of a gang plow, the forward end of which is connected to a tractor (not shown) in a manner well known to those skilled in the art. At the rear end of the beam 10 is disposed a conventional moldboard plow bottom 11 mounted on a plow standard or tool shank 12 which is formed of a steel beam of rectangular cross section similar to the draft beam 10 but of greater lateral thickness to withstand the bending stresses imposed upon it during plowing. The tool shank 12 is rigidly connected to the draft beam 10 by means of a bracket member, indicated in its entirety by the reference numeral 13. This bracket, which is shown and described in detail in my co-pending application, Serial No. 140,332, filed May 3, 1937, comprises, briefly, a heavy hollow casting of generally triangular shape the interior of which is formed to provide two angularly disposed intersecting sockets adapted to receive adjacent ends of the associated draft beam 10 and tool standard 12, respectively, as shown in the drawing. The beam 10 is secured in its socket by means of two bolts 14, while the tool standard 12 is secured to its respective socket by three bolts 15, 16 and 17.

Disposed behind the plow bottom 11 is a rear furrow wheel 20 which is journaled on a wheel spindle 21 supported in a fixed position in a wheel support 22, the latter being preferably formed as a casting. The wheel support 22 is swiveled on the vertically disposed portion of a crank axle 23 which is bent forwardly and is provided at its forward end with a transversely disposed spindle 24 swingably mounted in a bearing sleeve 25 formed on a frame member 26. The rear furrow wheel 20 and supporting structure, including the frame member 26, are shown and described in full detail in my co-pending application, Serial No. 159,933, filed August 19, 1937, and reference is directed to this application for details of construction and operation. Briefly, the frame member 26 is a triangularly shaped casting attached to the bracket member 13 using the same bolts 15, 16 and 17 which secure the plow standard 12 in its socket. The frame member 26 is adjustable both vertically and laterally relative to the bracket member 13 by means of eye bolts 30, 31 and 32 in a manner disclosed in my co-pending application, Serial No. 159,933, and forming the subject matter of that application.

The mechanism employed for locking the rear furrow wheel against castering when the plow is in operating position and for raising the rear end of the plow to transport position, comprises a bell crank member 33 which is pivotally mounted on a transverse bearing spindle 34 fixed on the end of the frame member 26. One arm of the bell crank member 33 is forked at 35 to receive a roller 36 which engages the upper surface of the forwardly inclined portion of the axle 23. A roller 40 is journaled on the other arm 41 of the bell crank 33 and is adapted to be received by a forked member 42 on the wheel support 22 when the plow is lowered into operative position as shown in Figures 1 and 2. When the roller 40 is so engaged by the forked member 42, the wheel 20 is locked against lateral swinging and is adapted to carry the landside pressure of the plow. A lever 43, secured in a socket formed in the bell crank 33 and projecting upwardly therefrom, is connected through suitable linkage with the lifting mechanism (not shown) which is used to raise and lower the plow.

The depth at which the plow bottom 11 operates is determined by a gauge wheel 45 which is journaled on the end of a crank axle 46 in any well known manner. Crank axle 46 is rigidly connected to the rear furrow wheel axle 23 and is angularly adjustable relative thereto for deeper or shallower plowing through the agency of a locking device 50 disposed on the end of the spindle 24. The latter extends beyond the bearing sleeve 25 and is provided with a tapered polyhedral portion 44, preferably square as shown, and having a threaded stud 47 projecting co-axially from the end thereof.

The locking device 50 comprises a bushing member 51 having a tapered square aperture 52 adapted to receive the squared portion 44 of the spindle 24. The outer surface of the member 51 is tapered in the form of a frustum and is provided with teeth 53 extending along the length thereof. The number of teeth 53 may be either odd or even, but in order to secure an angular adjustment between axles 46 and 23 of less than the width of one tooth, it is necessary that the number be not evenly divisible by the number of faces of the spindle portion 44, i. e., four in the embodiment shown and described herein. A complementary socket member 54 having an inner toothed surface adapted to cooperate with the conical toothed surface of the bushing member 51 is fixed to the end of the axle 46. Preferably, although not necessarily, the socket member 54 is provided with a sleeve portion 55 adapted to receive the end of the axle 46 and having apertures 57 through opposite sides thereof into which molten metal has been flowed to secure a welded connection. The socket member 54 is wedged onto the tapered bushing member 51 and held in position by means of a washer 56, lock washer 60, and nut 61, the latter being in threaded engagement with the stud 47.

The depth of plowing is regulated by adjusting the angle of the crank axle 46 relative to the crank axle 23. Inasmuch as the position of the furrow wheel 20 is normally fixed with respect to the point of the plow, it follows that any change in the angle between crank axles 46 and 23 has the effect of changing the vertical position of the gauge wheel 45 relative to the plow bottom 11. Thus, by increasing the angle between crank axles 46 and 23 the gauge wheel 45 is raised relative to the point of the plow, causing the plow to run deeper to bring the gauge wheel again into contact with the ground. Likewise, decreasing the angle between crank axles decreases the plowing depth.

Coarse angular adjustment within the width of one tooth 53 of the crank axle 46 relative to the crank axle 23 is secured by removing the washer 56, withdrawing the socket member 54 from its toothed engagement with the member 51, and swinging the crank axle 46 to the desired position before clamping the locking member 50 together again. When it is desired to adjust the crank axle 46 through a smaller angle than the width of one tooth, adjustment is made in the following manner:

The crank axle 46 is first adjusted to the closest position possible, relative to the crank axle 23, by the coarse adjustment described above. Assume now that it is desired to effect an additional angular adjustment in a clockwise direction to the extent of one-quarter of the width of one of the teeth 53. The socket member 54 is then withdrawn from the bushing member 51, and the latter removed from the end of the squared shaft portion 24, turned through a quarter turn, and replaced on the squared end of the shaft. The socket member 54 is again engaged with the member 51, being now advanced by one-quarter of the width of one of the teeth 53 from its original position. Similarly, to secure an angular adjustment equal to half the width of a tooth, the member 51 is turned through a half turn before being replaced on the squared portion 24, and for three-quarters the width of a tooth, through three-quarters of a turn.

In the embodiment chosen to illustrate my invention I have shown a locking device having twenty-nine teeth and a four-sided shaft, although it is to be understood that similar angular adjustment of less than the width of a tooth might be had by using an even number of teeth, such as twenty-six, which is not evenly divisible by four, in conjunction with the four-sided shaft end 44, or by using a polyhedral shaft end of more than four sides and any number of teeth, either odd or even, not evenly divisible by the number of faces on the shaft.

The operation of my gauging device is as follows:

When the plow is in normal operative position, as illustrated in Figure 1, the point of the plow and the contact point of the rear furrow wheel 20 lie in substantially the same horizontal plane, while the gauge wheel 45 bears upon the surface of the ground to the landside of the plow bottom 11. The furrow wheel 20 is locked against castering by the engagement of the roller 40 with the fork 42 and both furrow wheel and gauge wheel bear a portion of the weight, or downward pressure of the plow bottom 11. When the plow tends to suck in below the desired depth, the gauge wheel 45 rises relative to the plow body 11 rotating the spindle 24 and pushing the rear furrow wheel 20 below the point of the plow. The plow will then rise gradually until the excess pressure on the two wheels is relieved.

Should the gauge wheel 45 pass over a sudden rise in the ground or an obstacle such as a log or rock, it will swing upwardly on its axle 46 about the pivot provided by the spindle 24. This, in turn, causes the furrow wheel axle 23 to swing downwardly, pushing the rear wheel 20 below the point of the plow bottom 11. By thus dissipating in the soft soil of the furrow bottom the sudden upward thrusts exerted by such obstacles on the gauge wheel 45, the effect of the disturbance on the plow body 11 is minimized and the bottom of the furrow is maintained relatively level with respect to the general contour of the ground.

What I claim as my invention and desire to secure by Letters Patent is:

1. The combination with a plow having a frame and a furrow forming share supported thereon, of depth gauging means comprising a wheel supporting member pivotally connected to said frame for vertical swinging, and extending rearwardly therefrom, a furrow wheel journaled on said member and positioned to run in the furrow formed by said share, a second wheel supporting member pivotally connected to said frame for vertical swinging and extending forwardly therefrom, a gauge wheel journaled on said second member and positioned to run on the unbroken ground, and means interconnecting said wheel supporting members whereby swinging movement of one of the members causes the other of said members to swing in the opposite direction.

2. The combination with a plow having a supporting structure and a furrow forming tool fixed thereto, of depth gauging means comprising a wheel supporting member journaled on said supporting structure for swinging about a transverse axis, said wheel supporting member having a forwardly extending portion and a rearwardly extending portion arranged on opposite sides of the axis thereof, a gauge wheel journaled on said forwardly extending portion and positioned to run on the unbroken ground, and a furrow wheel journaled on said rearwardly extending portion and disposed behind said tool to run in the furrow formed thereby.

3. The combination with a plow having a supporting structure and a furrow forming tool fixed thereto, of depth gauging means comprising a crank axle journaled on said supporting structure for rotation about a transverse axis and extending rearwardly therefrom, a furrow wheel journaled on said crank axle and positioned to run behind said tool in the furrow formed thereby, a second crank axle fixed to said first named crank axle and extending forwardly from said transverse axis, and a gauge wheel journaled on said second crank axle and disposed to run on the unbroken land adjacent said tool.

4. The combination with a plow having a supporting structure and a furrow forming tool fixed thereto, of depth gauging means comprising a crank axle having a transverse spindle portion journaled on said supporting structure, said crank axle extending rearwardly from said spindle portion, a rear furrow wheel journaled on said crank axle and disposed to run in the furrow formed by said tool, a second crank axle fixed to said spindle portion and extending forwardly therefrom, a gauge wheel journaled on said second crank axle and positioned to run on the unbroken ground, and means for varying the angular relation between said crank axles.

5. In combination with a plow having a furrow forming share and a supporting member, a rear furrow wheel disposed behind said share and positioned to run in the furrow formed thereby, a crank axle journaled on said wheel and having a transverse spindle portion journaled on said supporting member, a gauge wheel disposed ahead of said transverse spindle and adapted to run on the unbroken ground adjacent said share, a crank axle journaled on said gauge wheel, and means for clamping said second named crank axle to the spindle portion of said first named crank axle in different angular positions.

6. Clamping means comprising, in combination with a first member provided with a shaft portion having a plurality of angularly disposed faces of equal width, and a second member adapted to be mounted on said first member in different angular positions, a connecting bushing member having a socket portion adapted to receive said shaft portion in any of several angular positions relative thereto, and means comprising complementary toothed surfaces on said connecting member and said second member, respectively, for locking said last named members together in different angular positions, the number of interlocking teeth on said complementary toothed surfaces being not evenly divisible by the number of said faces on said shaft portion.

7. In combination with a plow having a frame and a plow body carried thereon, a crank axle provided at one end with a transverse spindle having a polyhedral shaft portion with $n$ faces of equal width, means for rotatably mounting said spindle on said frame, a wheel journaled on said crank axle, a second crank axle extending from said spindle in angular relation to said first named crank axle, a second wheel journaled on said second crank axle, and means for clamping said crank axles together in different angular positions comprising a socket member fixed to said second crank axle and having an inner toothed surface, a complementary bushing member having a toothed outer surface adapted to cooperate with said inner toothed surface, each of said members having a number of teeth not evenly divisible by $n$, said bushing member having a socket portion adapted to be received on said polyhedral shaft portion in any of several angular positions relative thereto so that said bushing member may be rotated relative to said socket member through an angular extent equal to $360/n$ degrees, and means for clamping said complementary members together with their teeth interlocked.

8. The combination with a first member provided with a tapered shaft portion having a plurality of angularly disposed faces of equal width, and a second member adapted to be mounted on said first member in different angular positions, of means for connecting said members together comprising a bushing having an aperture adapted to receive said tapered shaft portion in any of several angular positions relative thereto, said bushing having a tapered outer surface provided with a number of teeth not evenly divisible by the number of faces on said tapered shaft portion, said second member having a socket portion adapted to receive said bushing and provided with teeth adapted to interlock with said bushing teeth, and means for clamping said first member, said bushing, and said second member together.

9. In combination with an implement including a frame and a furrow forming tool supporting shank fixed thereto, a furrow wheel disposed behind said shank to run in the furrow formed by the tool supported on said shank, a second wheel spaced in a fore and aft direction from said furrow wheel and disposed to run on the unbroken land, a supporting member interconnecting said wheels, and means, intermediate the axes of said wheels, for pivotally connecting said supporting member to said frame adjacent said tool supporting shank.

10. In combination with an implement including a furrow forming tool, a furrow wheel disposed behind said tool to run in the furrow formed thereby and connected to said implement by means permitting vertical movement relative thereto, a gauge wheel positioned to run on the unbroken land and connected to said implement for vertical movement relative thereto, means interconnecting said gauge wheel and said furrow wheel whereby vertical movement of one of said wheels relative to said implement causes the other of said wheels to be moved in the opposite direction, and means for adjusting both of said wheels vertically relative to said implement for adjusting the depth of said furrow.

11. In combination with a plow having a frame and a furrow forming share supported thereon, a furrow wheel disposed behind said share to run in the furrow formed thereby, a gauge wheel positioned to run on the unbroken land adjacent said share and appreciably ahead of said furrow wheel, a supporting member interconnecting said wheels and having means disposed between the axes of said wheels for pivotally connecting said supporting member to said plow frame, and means for adjusting the vertical position of said gauge wheel relative to said furrow wheel for regulating the depth of said furrow.

12. In combination with an implement having a frame, a furrow forming tool mounted thereon, a wheel support connected with said frame for rocking movement about a horizontal axis, a gauge wheel journalled on said support to one side of said axis and disposed to run on the unbroken ground, a rear furrow wheel journaled on said support on the other side of said axis and disposed to run in the furrow behind said tool, and means for varying the position of said gauge wheel in relation to said rear furrow wheel and said horizontal axis.

13. In combination with an implement having a frame, a furrow forming tool mounted thereon, a wheel support connected with said frame for vertical swinging movement about a transverse axis, a gauge wheel journaled on said support ahead of said axis and disposed to run on the unbroken ground adjacent said tool, a furrow wheel journaled on said support to the rear of said axis and disposed to run in the furrow behind said tool, and means for varying the angular relationship between said transverse axis and the axes of said wheels.

14. A pair of members, means for connecting them together in different angular relation comprising a bushing element having a toothed outer surface, a complementary socket element adapted to receive said bushing element and having a toothed inner surface adapted to cooperate with said toothed outer surface, one of said elements being fixed to one of said members, means for mounting the other of said toothed elements on the other of said members in any of $n$ equally spaced angular positions, each of said toothed elements having a certain number of teeth not evenly divisible by $n$, and means for clamping said elements together with their teeth interlocking.

15. In combination with a member having a polyhedral shaft portion provided with $n$ faces of equal width, and a second member adapted to be connected with said first named member in different angular positions relative thereto, means for connecting said members comprising two complementary toothed elements adapted to be clamped together in different angular positions with their teeth interlocked, each of said elements having a number of teeth not evenly divisible by $n$, one of said elements being secured to said second member, means for mounting the other of said elements on the polyhedral shaft portion of said first named member in any of several angular positions relative thereto spaced $360/n$ degrees apart, and means for securing said members together with said toothed elements in interlocking engagement.

CARL G. STRANDLUND.